Feb. 3, 1925.

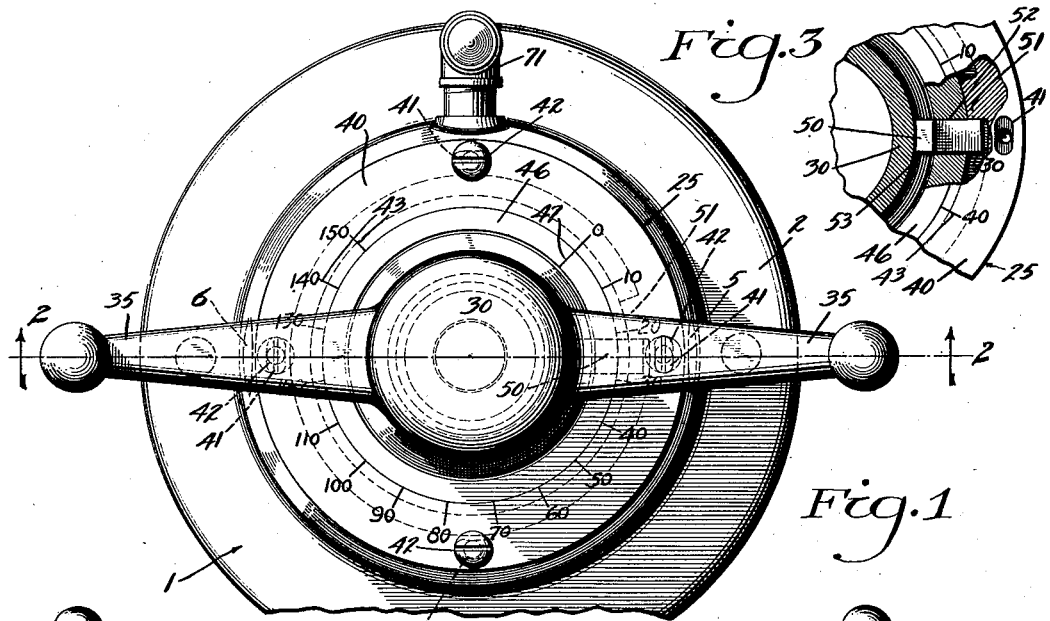
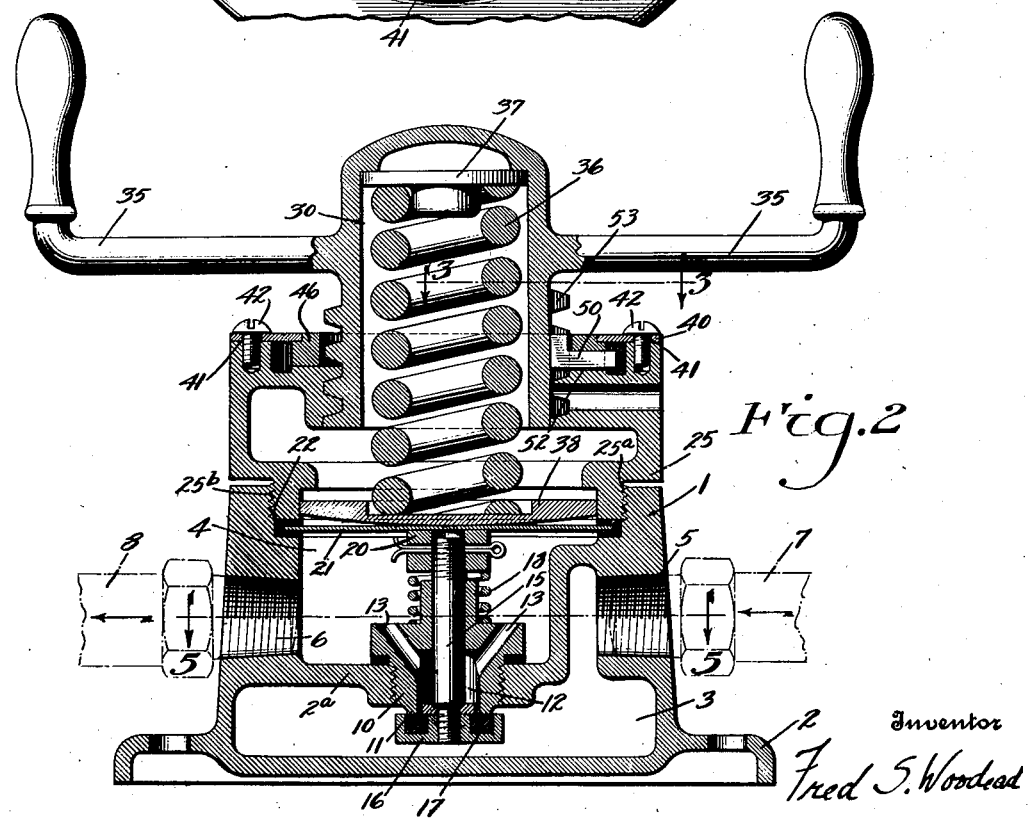

F. S. WOODEAD

PRESSURE GAUGE

Filed Jan. 25, 1923

Inventor
Fred S. Woodead
By Wood & Wood
Attorneys

Patented Feb. 3, 1925.

1,524,852

UNITED STATES PATENT OFFICE.

FRED S. WOODEAD, OF CINCINNATI, OHIO, ASSIGNOR TO THE MATTMAN & SINCLAIR COMPANY, OF CINCINNATI, OHIO, A CORPORATION.

PRESSURE GAUGE.

Application filed January 25, 1923. Serial No. 614,751.

*To all whom it may concern:*

Be it known that I, FRED SMITH WOODEAD, a citizen of the United States, and residing at Cincinnati, in the county of Hamilton and State of Ohio, have invented a new and useful Improvement in Pressure Gauges, of which the following specification is a full disclosure.

This invention relates to pressure gauges and particularly to a type of gauge device for air pressure service, as for inflating pneumatic tires, whereby a setting can be made for a determined degree of tire inflation and the service automatically cut off when such degree is reached.

An object of the invention is to provide an air pressure delivery control and gauge device for tire inflation service for conveniently and quickly inflating a tire to a determined degree of pressure, to the elimination of the use of a hand gauge now commonly employed and to relieve the flexible delivery tube, leading from the gauge, from sustaining the high supply pressure when the service is not utilized thus increasing the life of the delivery tube, and also reducing the waste of air through leakage.

Another object of the invention is the provision of an automatic cut-off pressure gauge having means manually operable for setting the gauge to obtain a delivery of fluid under pressure, the gauge automatically operable after setting, for interrupting the fluid supply when a determined pressure as indicated by dial graduations thereon has been obtained.

Another object of the invention is the provision of adjusting means for obtaining accurate registration between the graduations of the cooperative dial elements for correcting the dial readings of the gauge to compensate for changes or fluctuations in the pressure regulating means, assuring accurate correspondence between dial readings and pressures.

Another object of the invention is the provision of a detachable compression and dial unit attachable to the gauge base, and functioning as a means for clampingly sustaining a diaphragm in operative position within the base, said unit carrying means for flexing or depressing the diaphragm under predetermined pressure as indicated by the dial graduations indicative of such pressure.

Another object of the invention is to provide an audible signal as means of notification that the device is in operation, said signal means attached to the device and the pressure operable thereby, the signal being discontinued when sufficient pressure as indicated by the dial has been obtained but giving an audible signal when the device is delivering air either during regular service periods, or when there is a leak in the delivery line.

Other objects and certain advantages will be more fully set forth in the description of the accompanying drawings forming a part of this application, in which:

Figure 1 is a top plan view of the device, its parts set in initial position.

Figure 2 is a vertical central section on line 2—2, of Fig. 1, with the parts in initial position corresponding to Fig. 1.

Figure 3 is a detail plan section on line 3—3, of Fig. 2, illustrating a dial structure and stops for limiting rotative movement of the translatable member.

Figure 4:
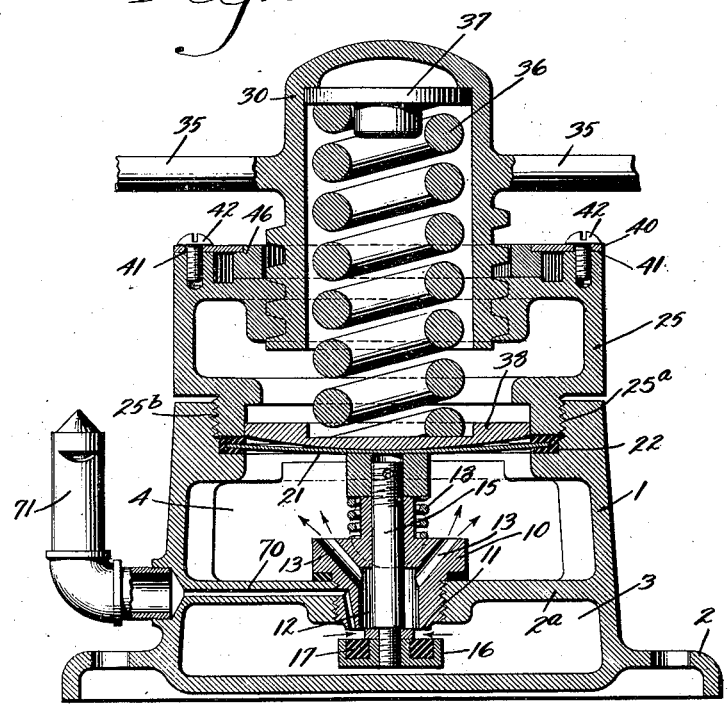
Figure 4 is a vertical central section in a plane at a right angle to Fig. 2, showing the mechanism set for the admission of air, and illustrating the connection of the signal device.
Figure 5:
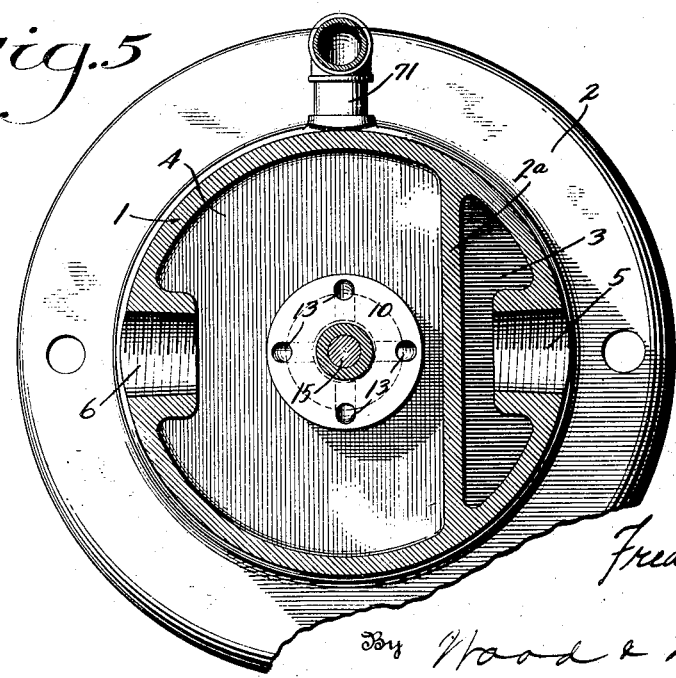
Figure 5 is a plan section on line 5—5, of Fig. 2, showing the construction of the base.

The device comprises a tubular base 1 having at its bottom a circumferential flange 2, traversable by suitable fastening devices for attaching the base to a support. The base is divided horizontally by a partition 2ª to provide, in this instance, lower inlet and upper outlet chambers, respectively 3 and 4, the chambers having openings, 5 and 6, respectively inlet and outlet openings, said openings threaded for engagement with supply and delivery conduits. The inlet conduit 7, indicated in dot-and-dash lines in Fig. 2, is adapted to connect the inlet chamber with an air pressure supply tank, not herein shown. The outlet conduit 8, indicated in dot-and-dash lines in Fig. 2, is preferably represented as a flexible tube having a check valve controlled slip coupling at its free end adapted to be connected with the tire stem or tire. The air passes from the chamber 3 to the chamber 4, through a valve control passage, thence to the conduit 8 and into the tire casing. The partition 2ª is vertically bored and threaded for the reception of a correspondingly threaded plug or nipple 10 machined to provide a valve seat 11 at its lower side, a central passage 12, and lateral passages 13, arranged in diametric pairs extending therefrom, providing communication between the chambers 3 and 4. A valve stem 15 slidably traverses the plug and passage 12, the passage being of larger diameter than the stem. The valve stem extends above the plug and is threaded at its upper end. The lower end of the stem is reduced to form a shoulder, the reduced portion threaded, and a valve disc 16 is engaged with the threads and abuts said shoulder. The disc is grooved and the groove packed as at 17, the packing material engaging with the valve seat 11 when the valve is closed. The valve is held normally closed by a compression spring 18 surrounding an extension of the plug at its upper side, the upper end of the spring engaging a nut 20 as an abutment member, said nut in threaded engagement with the upper end of the valve stem. The upper face of the nut abuts a flexible circular diaphragm 21 mounted in a resilient frame disposed horizontally within a cavity 22 at the upper part of the base 1, said diaphragm being held compressively and removably within said cavity by the lower end of a cap or housing 25 in threaded engagement as at 25ª with corresponding threads 25ᵇ of said cavity. Depression or flexure of the diaphragm downwardly against the upper end of the extension plug 10, as a stop, will open the valve against the action of the valve actuating spring. A pin traverses the nut and end of the valve stem to prevent disengagement of the nut. In order to set the device for delivering air at the desired pressure a suitable correlated dial and pressure mechanism is provided by which the diaphragm may be flexed under varying pressures, which pressures correspond to those desired for tire inflation. For this purpose the cap or housing 25 is provided with a rotatable and translatable tubular member 30 having exterior threads engaged with the corresponding interior threads of the cap or housing, whereby when the member 30 is rotated by means of its diametrically related handles 35, said member may be translated in either direction. As shown in Fig. 2, the parts of the device are in their initial position. A compression spring 36 is enclosed within the tubular feed member 30, has its upper end engaged and centered by an abutment plate 37 having a centering lug thereon engaged within the spring, and its lower end engaged with a follower disc 38 rounded on its bottom face, said rounded face engaged with the upper side of the diaphragm or that side opposite the side abutting the nut of the valve stem. By compressing the spring 36 the diaphragm is flexed against the action of the valve spring 18, the spring pressures opposing one another. The follower disc 38 has a socket in its upper face for receiving and centering the lower end of the compression spring 36.

An adjustable outer dial annulus 40 is set upon the upper side of the cap, its adjustability providing means for correction of the dial readings to compensate for fluctuations in spring resiliency and assure correct pressure readings. The means for adjusting the dial annulus for setting to compensate for the variations above mentioned, are obtained by providing diametrically related arcuate slots 41 traversed by clamping screws 42 engaged with the threaded openings of the cap. The outer adjustable annulus is provided with graduations 43, the graduations having suitable markings indicative of the pressure desired to be obtained, the zero mark or graduation corresponding to that position of the diaphragm shown in Fig. 2.

The dial annulus engages and retains a corresponding relatively thick inner annulus 46 having a mark 47 thereon adapted for registration with the marks of the annulus 40 for accurately setting the mechanism for delivering air, the supply being thereafter automaticaly cut off when a determined pressure has been obtained. The annulus 46 has a groove engagement with the annulus 40, said annulus 46 having a circumferential notch rotatably fitted against the annulus 40 with its bottom resting rotatably upon the floor of a circular depression at the top of the cap. A radial stop lug 51 projects inwardly from the side wall of the depression. The annulus 46 is capable of rotative movement only, while the translatable member 30 moves freely therethrough. The annulus 46 is connected with the translatable member 30 by a combined L-shaped stop and key member 50, the key traversing and being held in a vertical radially disposed groove 52 in the bottom of said annulus, with the outer end of the L-shaped member 50 lying in the path of and engageable with the stop lug 51, when said member 30 is rotated in either direction. The inner right angular extension or end of the member 50 engages a vertically disposed groove 53 parallel with the axis of the member 30 and traversing the threads thereof. The annulus 46 thus has splined connection with the translative member 30 whereby that member is freely translatable through said annulus, the upper surfaces of the inner and outer annuli being flush, and the inner annulus rotative.

The cap or housing including the translative member, dials and compression spring, forms a detachable unit, the lower end of which also functions to clamp the diaphragm, the housing being conveniently removable for repair or adjustment of the valve and related parts.

The operation of the device is as follows:

The operating arms 35 are grasped and the member 30 rotated to bring the graduation 47, of the annulus 46, opposite that graduation of the outer dial whose number may be indicative of the pressure desired. This rotation compresses the spring 36, exerting a downward pressure against the diaphragm, and opens the valve 16. The air passes into chamber 4 to the conduit 8 and thence into the tire. When the pressure in the tire and chamber 4 reaches a degree to overcome the tension of the spring 36 at which it was set, the valve 16 will be released and automatically closed.

A signal device is provided for indicating to the operator or attendant that the desired pressure has been reached, which device is connected at the outer end of a by-pass 70 extending through the partition 2ª, communicating with the chamber 3 and closable by the valve 16. The signal device is in the form of a whistle 71 suitably connected in pressure communication with the intake or supply chamber. Immediately upon the admission of air to the tire the whistle gives the signal, which signal continues until the valve 16 is closed which seals the passage 70 against the admission of air from chamber 3. Any well known form of signal device operable by fluid pressure may be used, such as a bell or light, and a detailed description or illustration of the structure of the whistle herein has not therefore been shown.

The conduit or delivery tube 8 is provided with the usual check valve control slip coupling which closes the tube against air discharge when not in use so that a pressure is maintained in the chamber 12 sufficient to keep the valve closed and relieve the delivery tube of the high storage or supply pressure in the event the attendant fails to return the gauge mechanism to normal position. Should the attendant fail to return the hand lever 35 to its normal position for releasing the tension of the spring 36 and a reduction in pressure below that for which the gauge mechanism is set, which may occur through leakage in the delivery tube 8, the valve 16 will open, functioning the whistle for a signal indication continuing until the gauge regulating mechanism is adjusted to release pressure upon the valve 16 or rectification made against leakage. This serves to reduce the cost of air service maintenance due to waste.

Having described the invention, I claim:

1. In a device of the class described, a cap, a graduated annulus attached thereto, a second annulus concentrically engaged with said graduated annulus and rotative relative thereto, a translatable member traversing said second annulus and in threaded engagement with said cap, a lug on said cap and a combined stop and key member carried by said second annulus, said stop having splined connection with said translative member and capable of engagement with said lug.

2. In a device of the class described, a base, a valve-operating diaphragm mounted therein, a cap compressively engaging said diaphragm, a rotatable and translatable member in threaded engagement with said cap, a spring abutting said diaphragm and rotatable and translatable member, an annulus having splined connection with said rotatable member, an adjustable annulus rotatably engaging said splined annulus and attached to said cap, and means for limiting rotative movement of said second annulus in both directions.

3. In a device of the class described, a cap, an outer annulus, having graduations thereon, said annulus adjustably attached to said cap, an inner annulus concentrically engaged with said graduated annulus and rotatable relatively thereto, a translative and rotative member freely traversing said inner annulus and in threaded engagement with said cap, a key carried by said inner annulus having splined connection with the said translative member, and a stop on said cap engageable by said key for limiting rotative movement of said translative member.

4. In a device of the class described, a base, having communicating chambers, a valve between said chambers, a diaphragm engaged with said valve for opening the same, a cap having an end compressively engaged with said diaphragm, an outer dial annulus attached to said cap, an inner dial annulus concentrically engaged with said outer annulus and rotative relative thereto, a translatable member loosely traversing said inner dial annulus and having threaded engagement with said cap, a spring abutting said translatable member and diaphragm, a key carried by said inner annulus having splined connection with said translatable member, and a stop on the said cap engageable by said key.

5. A casing having fluid inlet and outlet chambers, a self-closing valve for controlling fluid communicating between said chambers, a diaphragm disposed within said base, abutting said valve, a cap for said base clampingly engaged with said diaphragm, an outer annulus adjustably engaged with said cap and having graduations thereon, an inner annulus rotatably engaged with said outer annulus and having a mark thereon registerable with the graduations of said outer annulus, a translatable member traversing said inner annulus, a pressure spring abutting said translatable member and diaphragm, a key carried by said inner annulus having splined connection with said translatable member, and a stop on said cap engageable by said key for limiting rotative movement of said translatable member.

6. A fluid controlling and pressure gauging device, comprising a hollow casing having inlet and outlet chambers communicating through a valve-controlled port, a depressible check valve for controlling said port, a spring pressed diaphragm secured within said casing operative under its spring pressure for unseating said check valve, and alternately for releasing said valve for seating when the pressure in said outlet chamber prevails over the counteracting spring pressure, and a manually rotatable indicator member having a threaded engagement with said casing and capping one end of said diaphragm spring for regulating the diaphragm spring tension, whereby the device can be set for operation at predetermined pressure and indicates the amount of adjustment of said member and degree of pressure at which said valve closes and cuts off pressure service, and means for limiting the rotative movement of said member with a single revolution.

In witness whereof, I hereunto subscribe my name, as attested by the two subscribing witnesses.

FRED S. WOODEAD.

Witnesses:
L. A. BECK,
R. KISTNER.